(12) United States Patent
Sasaki et al.

(10) Patent No.: US 11,050,939 B2
(45) Date of Patent: Jun. 29, 2021

(54) IMAGE BLUR CORRECTION DEVICE THAT REDUCES IMAGE BLUR OF OPTICAL IMAGE, AND IMAGE CAPTURE APPARATUS

(71) Applicant: CANON KABUSHIKI KAISHA, Tokyo (JP)

(72) Inventors: Yusuke Sasaki, Tokyo (JP); Shunsuke Ninomiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/797,470

(22) Filed: Feb. 21, 2020

(65) Prior Publication Data

US 2020/0280665 A1    Sep. 3, 2020

(30) Foreign Application Priority Data

Feb. 28, 2019    (JP) .............................. JP2019-036139

(51) Int. Cl.
  *G03B 5/00*    (2021.01)
  *H04N 5/232*    (2006.01)
  *G03B 7/093*    (2021.01)

(52) U.S. Cl.
  CPC ............. *H04N 5/2328* (2013.01); *G03B 5/00* (2013.01); *G03B 7/093* (2013.01); *G03B 2205/0023* (2013.01); *G03B 2207/005* (2013.01)

(58) Field of Classification Search
  CPC ...... G03B 5/00; G03B 5/06; G03B 2207/005; H04N 5/2328
  See application file for complete search history.

(56) References Cited

U.S. PATENT DOCUMENTS

| 8,174,582 B2 | 5/2012 | Nagano et al. |
| 2010/0220206 A1 | 9/2010 | Nagano et al. |
| 2016/0229556 A1* | 8/2016 | Zhou .................... H04N 5/2328 |

FOREIGN PATENT DOCUMENTS

JP    2010-204276 A    9/2010

* cited by examiner

*Primary Examiner* — Minh Q Phan
(74) *Attorney, Agent, or Firm* — Venable LLP

(57) ABSTRACT

An image blur correction device capable of reducing its size in a direction orthogonal to an optical axis. A holding frame holding an image capture device is held movable in an X-axis direction, a Y-axis direction, and a rotational direction about an axis extending in a Z-axis direction. A first guide member, a second guide member, and a third guide member guide the holding frame in the X-axis direction, Y direction-axis, and in the rotational direction, respectively. A first vibration actuator drives the first guide member, a second vibration actuator drives the second guide member, and a third vibration actuator drives the third guide member. The third vibration actuator is arranged at a location more remote from the rotation center of the third guide member than at least one of the first and second vibration actuators, as viewed from the Z-axis direction.

12 Claims, 10 Drawing Sheets

IMAGE BLUR CORRECTION DEVICE THAT REDUCES IMAGE BLUR OF OPTICAL IMAGE, AND IMAGE CAPTURE APPARATUS

BACKGROUND OF THE INVENTION

Field of the Invention

The present invention relates to an image blur correction device that reduces an image blur of an optical image formed on an image capture device, and an image capture apparatus including the image blur correction device.

Description of the Related Art

An image capture apparatus has come into widespread use which includes an image blur correction device for reducing an image blur caused e.g. by a hand shake liable to occur e.g. when shooting is performed with the apparatus in a hand-held state. The image blur correction device detects a shake condition of the image capture apparatus using shake detection means, and moves an optical element, such as a lens or an image capture device, in a direction of offsetting the shake within a plane orthogonal to the optical axis of the optical element. With this, a deviation of an image forming position, caused by the shake, is corrected, whereby it is possible to eliminate the image blur.

For example, Japanese Laid-Open Patent Publication (Kokai) No. 2010-204276 describes an image blur correction device that is capable of not only linearly moving an optical element in two directions orthogonal to each other within a plane orthogonal to the optical axis, but also rotating the optical element.

In a case where the drive source of the image blur correction device is arranged around the optical element that corrects an image blur in the direction orthogonal to the optical axis as in the image blur correction device described in Japanese Laid-Open Patent Publication (Kokai) No. 2010-204276, the size of the image blur correction device can be reduced in the optical axis direction, but is increased in the direction orthogonal to the optical axis.

SUMMARY OF THE INVENTION

The present invention provides an image blur correction device that is capable of reducing its size in a direction orthogonal to an optical axis.

In a first aspect of the present invention, there is provided an image blur correction device comprising a driven member, a fixed member configured to movably hold the driven member in a first direction, in a second direction orthogonal to the first direction, and in a rotational direction about an axis extending in a third direction orthogonal to the first direction and the second direction, a first movable member configured to guide the driven member in the first direction, a second movable member configured to guide the driven member in the second direction, a third movable member configured to guide the driven member in the rotational direction, a first actuator configured to drive the first movable member, a second actuator configured to drive the second movable member, and a third actuator configured to drive the third movable member, wherein the driven member is a holding unit for holding an image capture device, and wherein the third movable member is arranged at a location more remote from a rotation center of the third movable member than at least one of the first actuator and the second actuator, as viewed from the third direction.

In a second aspect of the present invention, there is provided an image capture apparatus, comprising an image capture device, and an image blur correction device, the image blur correction device including a driven member, a fixed member configured to movably hold the driven member in a first direction, in a second direction orthogonal to the first direction, and in a rotational direction about an axis extending in a third direction orthogonal to the first direction and the second direction, a first movable member configured to guide the driven member in the first direction, a second movable member configured to guide the driven member in the second direction, a third movable member configured to guide the driven member in the rotational direction, a first actuator configured to drive the first movable member, a second actuator configured to drive the second movable member, and a third actuator configured to drive the third movable member, wherein the driven member is a holding unit for holding an image capture device or is an image capture device, and wherein the third movable member is arranged at a location more remote from a rotation center of the third movable member than at least one of the first actuator and the second actuator, as viewed from the third direction.

According to the present invention, it is possible to provide an image blur correction device that is capable of reducing its size in the direction orthogonal to the optical axis.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
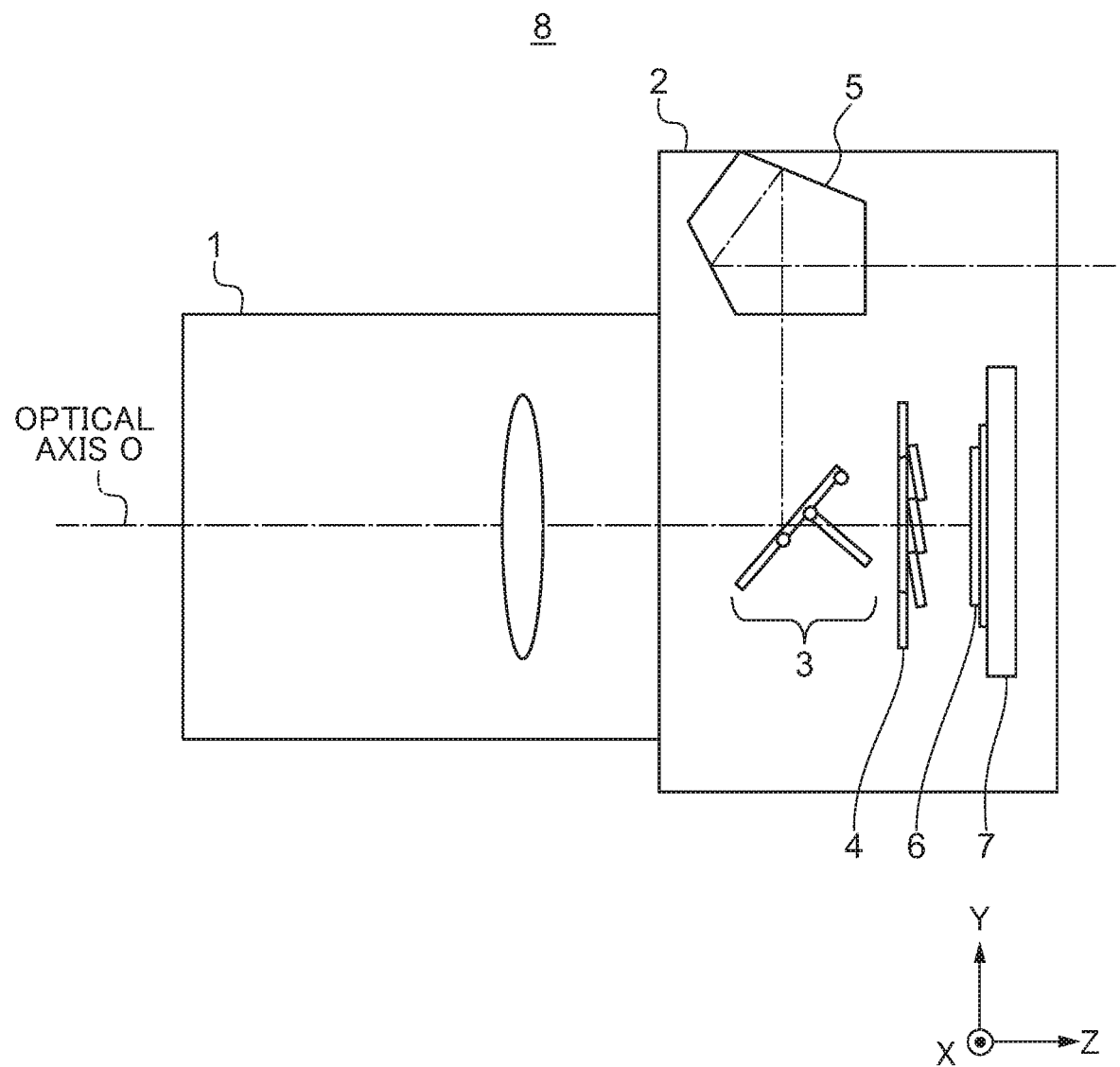
FIG. 1 is a schematic cross-sectional view of an image capture apparatus according to an embodiment of the present invention.

FIG. 1 is a schematic cross-sectional view of an image capture apparatus 8 including an image blur correction device according to an embodiment. The image capture apparatus 8 specifically refers e.g. to a digital camera or a digital video camera. The image capture apparatus 8 is roughly composed of a lens barrel 1 and a camera body 2. Note that the image capture apparatus 8 may have a structure in which the lens barrel 1 and the camera body 2 are integrated, as in a compact digital camera, or may have a structure in which the lens barrel 1 and the camera body 2 are removable from each other, as in a digital single-lens reflex camera. Further, the image capture apparatus 8 may be a so-called mirrorless camera without a mirror and a prism, referred to hereinafter. In the present embodiment, a description will be given of a configuration for correcting an image blur by moving (displacing) an image capture device 6 in a direction orthogonal to an optical axis O of the lens barrel 1. Note that the optical axis O passes through an image forming surface of the image capture device 6, and is orthogonal to the image forming surface.

Note that, as shown in FIG. 1, an optical axis direction (direction parallel to the optical axis O) of the lens barrel 1 is defined as a Z-axis direction (third direction), two directions orthogonal to each other within a plane orthogonal to the Z-axis direction are defined as an X-axis direction (first direction) and a Y-axis direction (second direction) for convenience of explanation. In a state in which the Z-axis direction is parallel to a horizontal direction, the Y-axis direction is parallel to a vertical direction, and the X-axis direction is parallel to a horizontal direction. A position of the image capture apparatus 8, in which the optical axis O (Z-axis direction) is substantially parallel to the horizontal direction and the Y-axis direction is substantially parallel to the vertical direction, is defined as the normal position of the image capture apparatus 8. The image capture device 6 has a rectangular shape (shape of a rectangle), and when the image capture apparatus 8 is in the normal position, a long side of the image capture device 6 is substantially parallel to the horizontal direction.

Inside the lens barrel 1 or the camera body 2, there are arranged an angular speed sensor and an acceleration sensor (not shown) for image blur correction. Inside the lens barrel 1, there is arranged an image capture optical system including a zoom lens group and a focus lens group. Inside the camera body 2, there are arranged a mirror unit 3, a shutter unit 4, a prism 5, the image capture device 6, and the image blur correction device.

When the image capture apparatus 8 is in a shooting preparation state, a light flux reflected by the mirror unit 3 is guided to an eye of a photographer (not shown) through the prism 5. When shooting is performed, the mirror unit 3 is shifted to a mirror-up position (not shown), whereby a light flux from an object, having passed through the lens barrel 1, is guided to the image capture device 6 and forms an image on the image forming surface of the image capture device 6. An amount of exposure to the image capture device 6 is controlled by a shutter operation (exposure operation) of the shutter unit 4, which is performed at a predetermined speed. The image capture device 6 is e.g. a CCD or CMOS sensor, and converts an optical image formed on the image forming surface to electrical signals by photoelectrical conversion.

If an external force, such as a shake, is applied to the image capture apparatus 8 during shooting, an image formed on the image forming surface of the image capture device 6 is blurred, which sometimes lowers image quality. To correct (reduce) such an image blur, the image blur correction device, denoted by reference numeral 7, moves the image capture device 6 in a direction orthogonal to the optical axis O, based on output signals from the angular speed sensor and the acceleration sensor (not shown) arranged in the camera body 2. Note that the plane orthogonal to the optical axis O refers to, taking into consideration the dimension accuracy and the assembly accuracy of various components of the lens barrel 1 and the camera body 2, a plane which can be regarded substantially orthogonal to the optical axis O, and is not required to be physically strictly orthogonal to the optical axis O.

Figure 2A:
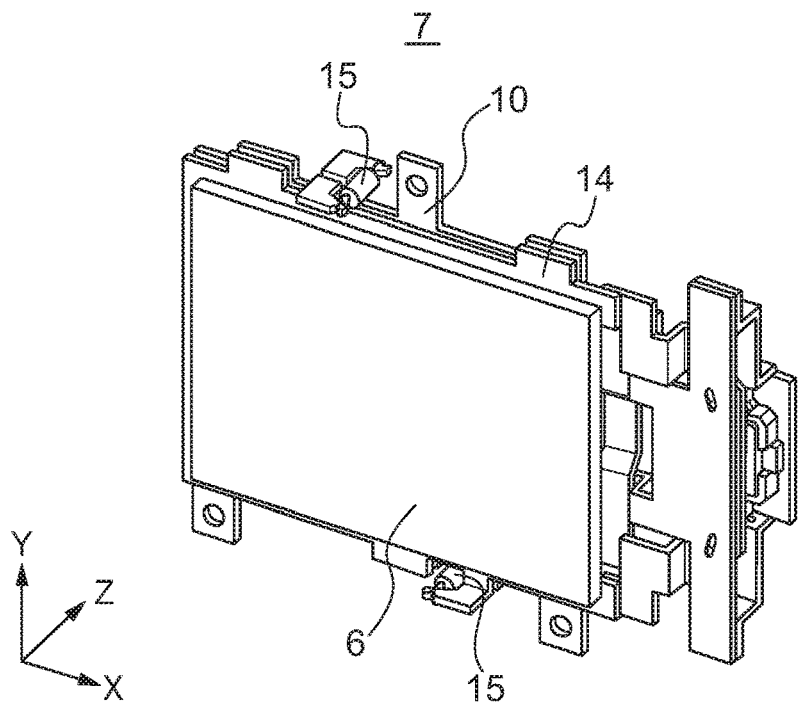
FIGS. 2A and 2B are views of an image blur correction device included in the image capture apparatus.
Figure 2B:
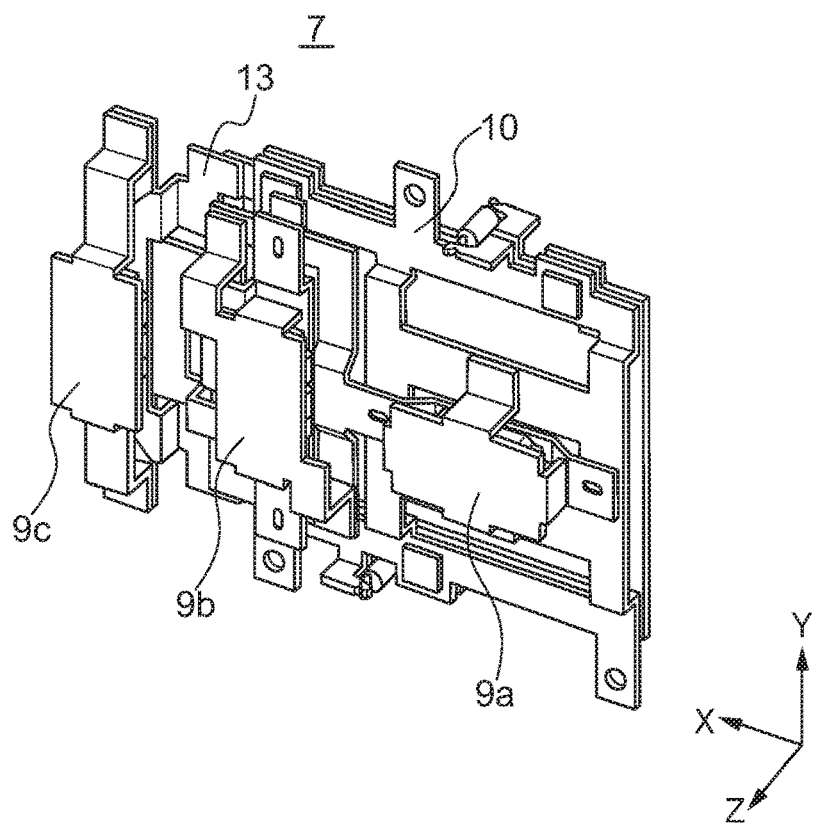
Figure 3:
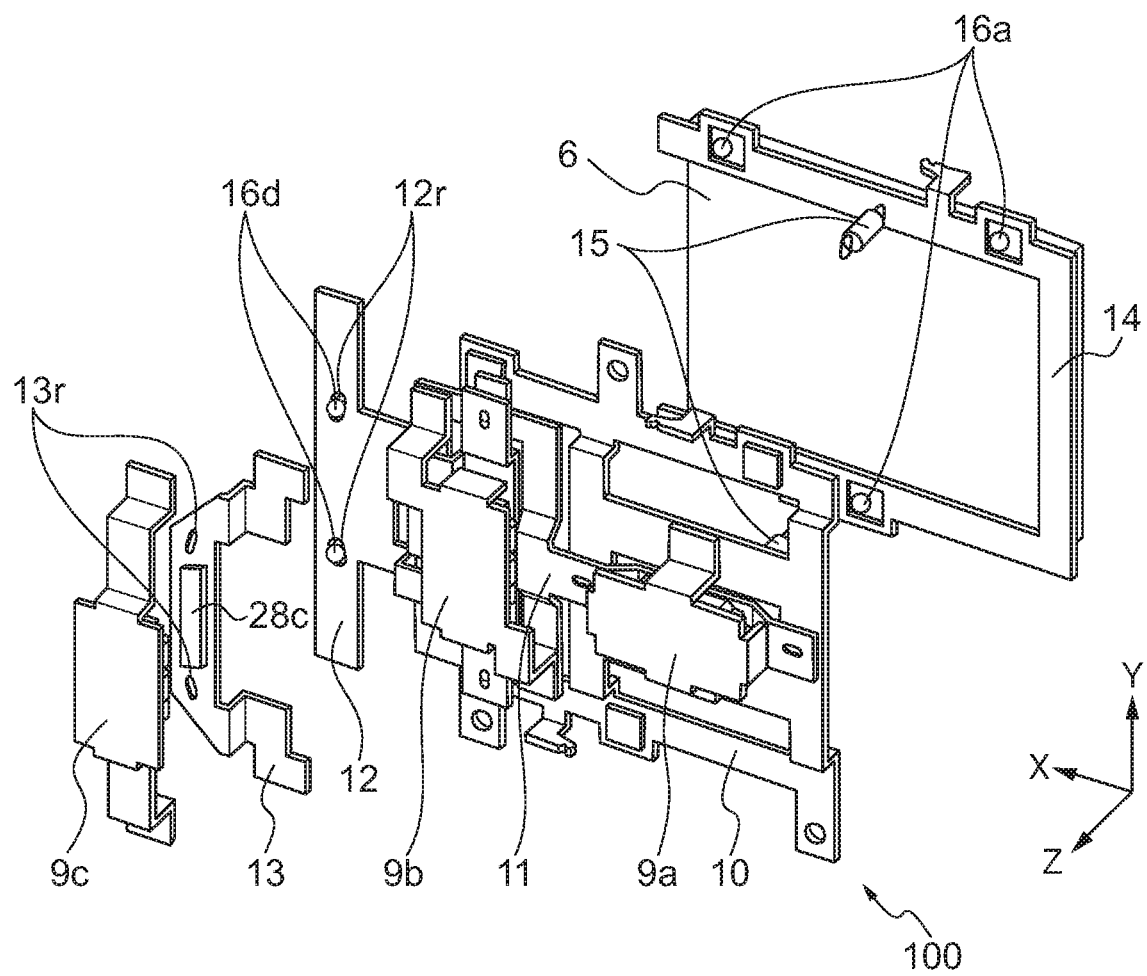
FIG. 3 is an exploded perspective view of the image blur correction device.
Figure 4:
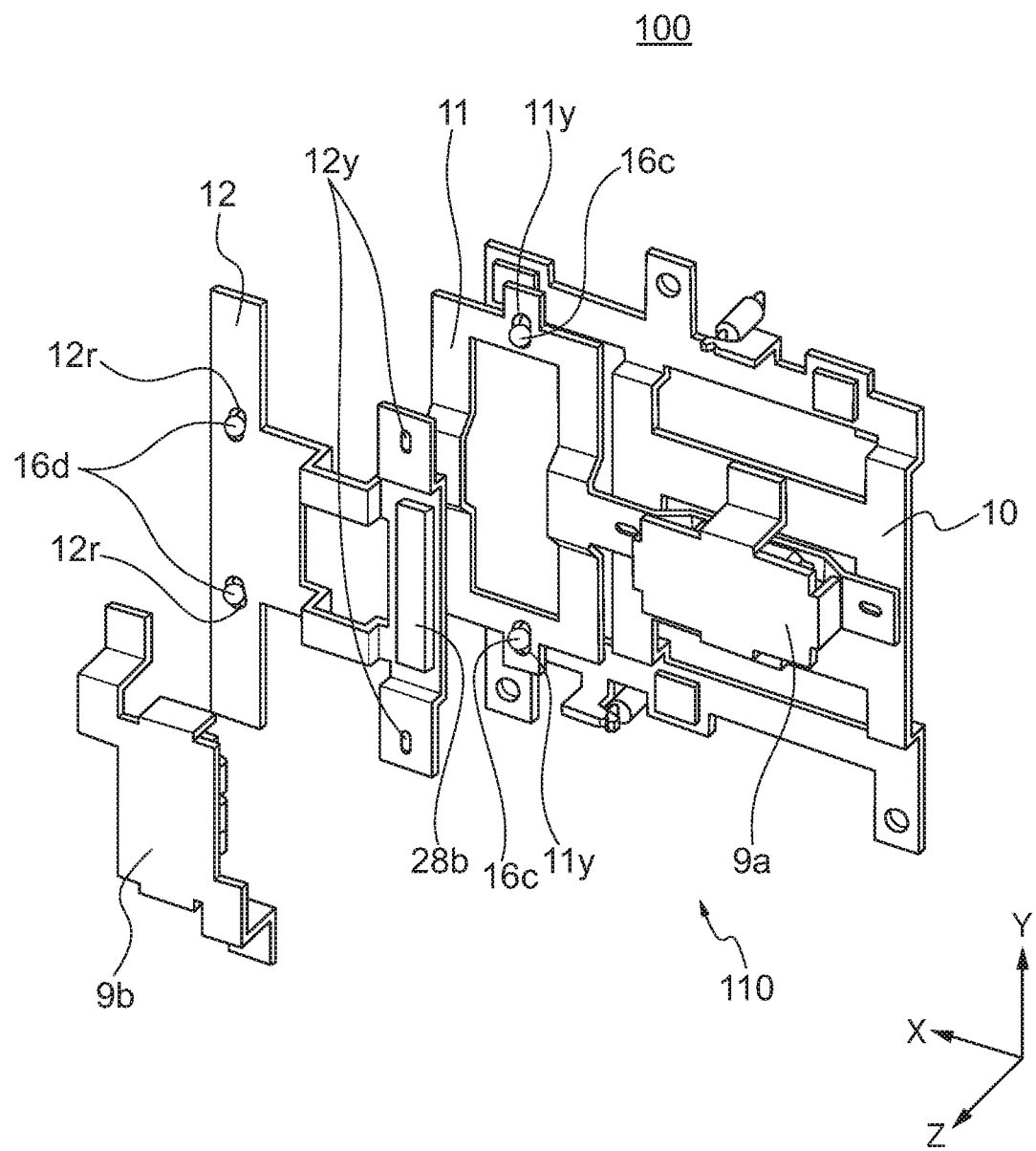
FIG. 4 is an exploded perspective view of a component group appearing in FIG. 3.
Figure 5:
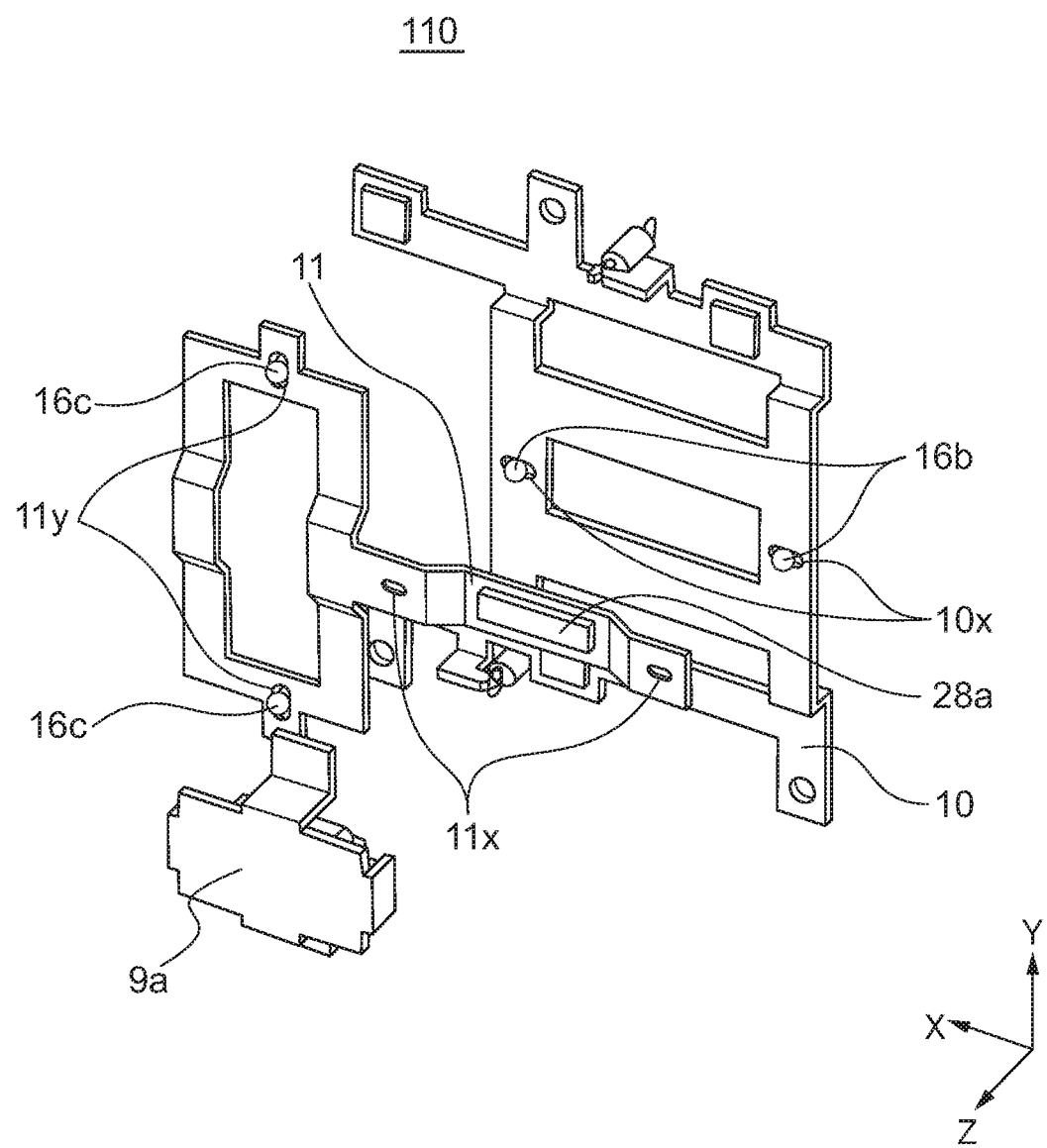
FIG. 5 is an exploded perspective view of a component group appearing in FIG. 4.

Next, the construction of the image blur correction device 7 will be described. FIGS. 2A and 2B are perspective views of the image blur correction device 7, in which FIG. 2A is a perspective view of the image blur correction device 7, as viewed from the front of the image capture apparatus 8, and FIG. 2B is a perspective view of the image blur correction device 7, as viewed from the rear of the image capture apparatus 8. FIG. 3 is an exploded perspective view of the image blur correction device 7. FIG. 4 is an exploded perspective view of a component group 100 appearing in FIG. 3. FIG. 5 is an exploded perspective view of a component group 110 appearing in FIG. 4.

The image blur correction device 7 includes a fixed member 10, an image capture device-holding member 14 (hereinafter referred to as the "holding member 14"), and urging springs 15. Further, the image blur correction device 7 includes, as rolling members, three balls 16a, two balls 16b, two balls 16c, and two balls 16d. Further, the image blur correction device 7 includes a first guide member 11 (first movable member), a second guide member 12 (second movable member), and a third guide member 13 (third movable member). Further, the image blur correction device 7 includes a first vibration actuator 9a, a second vibration actuator 9b, and a third vibration actuator 9c.

The fixed member 10 is fixed to the camera body 2 e.g. with screws (not shown). As shown in FIG. 3, the balls 16a are interposed at three locations between the holding member 14 and the fixed member 10, and in this state, the holding member 14 is connected to the fixed member 10 by the urging springs 15. The holding member 14 is pressed toward the fixed member 10 by the urging force of the urging springs 15, mainly acting in the Z-axis direction. Respective rolling portions of the holding member 14 and the fixed member 10, on which the three rolling balls 16a are arranged, each form a flat surface, and the direction of movement of the holding member 14 on the fixed member 10 is not restricted. The holding member 14 holds the image capture device 6. The image blur correction device 7 moves the holding member 14 within a plane orthogonal to the optical axis O with respect to the fixed member 10 to thereby move the image capture device 6 within the plane orthogonal to the optical axis O.

As shown in FIG. 5, the first guide member 11 is arranged with respect to the fixed member 10 such that two rolling grooves 10x formed in the fixed member 10 and two rolling grooves 11x formed in the first guide member 11 are opposed to each other in the Z-axis direction. The balls 16b are sandwiched and held between respective associated pairs of the rolling grooves 10x and the rolling grooves 11x, provided at two locations. The rolling grooves 10x and the rolling grooves 11x each have a certain length in the X-axis direction, but have a width shorter than a diameter of each ball 16b in the Y-axis direction such that the first guide member 11 is movable in the X-axis direction with respect to the fixed member 10, but is restricted from moving in the Y-axis direction.

The first vibration actuator 9a is fixed to the fixed member 10. Although the structure of the first vibration actuator 9a will be described hereinafter, a vibration element 20 (see FIG. 6B) of the first vibration actuator 9a is in contact with a contact body 28a (friction receiving sliding member) mounted on the first guide member 11. When the first vibration actuator 9a is driven, the vibration element 20 applies thrust (friction drive force) to the contact body 28a in the X-axis direction, whereby the first guide member 11 is moved in the X-axis direction. At this time, the balls 16b roll between the fixed member 10 and the first guide member 11, which enables the first guide member 11 to be smoothly moved.

As shown in FIG. 4, the second guide member 12 is arranged with respect to the first guide member 11 such that two rolling grooves 11y formed in the first guide member 11 and two rolling grooves 12y formed in the second guide member 12 are opposed to each other in the Z-axis direction. The balls 16c are sandwiched and held between respective associated pairs of the rolling grooves 11y and the rolling grooves 12y, provided at two locations. The rolling grooves 11y and the rolling grooves 12y each have a certain length in the Y-axis direction, but has a width shorter than a diameter of each ball 16c in the X-axis direction such that the second guide member 12 is movable in the Y-axis direction with respect to the first guide member 11, but is restricted from moving in the X-axis direction.

The second vibration actuator 9b is fixed to the first guide member 11. The second vibration actuator 9b has the same structure as that of the first vibration actuator 9a. The vibration element 20 of the second vibration actuator 9b is in contact with a contact body 28b mounted on the second guide member 12. When the second vibration actuator 9b is driven, thrust is applied to the contact body 28b in the Y-axis direction, whereby the second guide member 12 is moved in the Y-axis direction. At this time, the balls 16b roll between the first guide member 11 and the second guide member 12, which enables the second guide member 12 to be smoothly moved.

As shown in FIG. 3, the third guide member 13 is arranged with respect to the second guide member 12 such that two rolling grooves 12r formed in the second guide member 12 and two rolling grooves 13r formed in the third guide member 13 are opposed to each other in the Z-axis direction. The third guide member 13 is connected to the holding member 14 e.g. with screws (not shown). The balls 16d are sandwiched and held between respective associated pairs of the rolling grooves 12r and the rolling grooves 13r, provided at two locations.

The third vibration actuator 9c is fixed to the second guide member 12. The third vibration actuator 9c has the same structure as that of the first vibration actuator 9a. The vibration element 20 of the third vibration actuator 9c is in contact with a contact body 28c mounted on the third guide member 13. Here, the rolling grooves 12r and the rolling grooves 13r each have an arc shape based on the same arc having the optical axis O as the center, and the third vibration actuator 9c applies thrust to the contact body 28c in the Y-axis direction on a tangent line of the same arc. This enables the third guide member 13 to be rotated about the optical axis O along the arc shapes of the rolling grooves 12r and the rolling grooves 13r. Note that the width of the rolling groove 12r and the rolling groove 13r is set to be shorter than a diameter of each ball 16d so as to restrict the third guide member 13 from moving in a direction other than the rotational direction. The balls 16d roll between the second guide member 12 and the third guide member 13, which enables the third guide member 13 to be smoothly moved.

When the first vibration actuator 9a is driven, the first guide member 11, the second guide member 12, the third guide member 13, the second vibration actuator 9b, the third vibration actuator 9c, and the holding member 14 are moved in the X-axis direction in unison. Then, when the second vibration actuator 9b is driven, the second guide member 12, the third guide member 13, the third vibration actuator 9c, and the holding member 14 are moved in the Y-axis direction in unison. Further, when the third vibration actuator 9c is driven, the third guide member 13 and the holding member 14 are rotated. The third guide member 13 is connected to the holding member 14, and the holding member 14 holds the image capture device 6. Therefore, the third guide member 13 is moved and is rotated in unison with the holding member 14 and the image capture device 6. Thus, the image blur correction device 7 is capable of correcting (reducing) an image blur by moving the image capture device 6 relative to the fixed member 10 in the X-axis direction and the Y-axis direction, and rotating the same about the optical axis O within the X-Y plane.

Note that in the present embodiment, the holding member 14 is set as a member to be directly driven by the image blur correction device 7, and the image capture device 6 is driven by driving the holding member 14. However, this is not limitative, but the configuration may be such that the image capture device 6 is directly driven e.g. by directly connecting the third guide member 13 to the image capture device 6, depending on the construction of the image capture device 6.

Figure 6A:
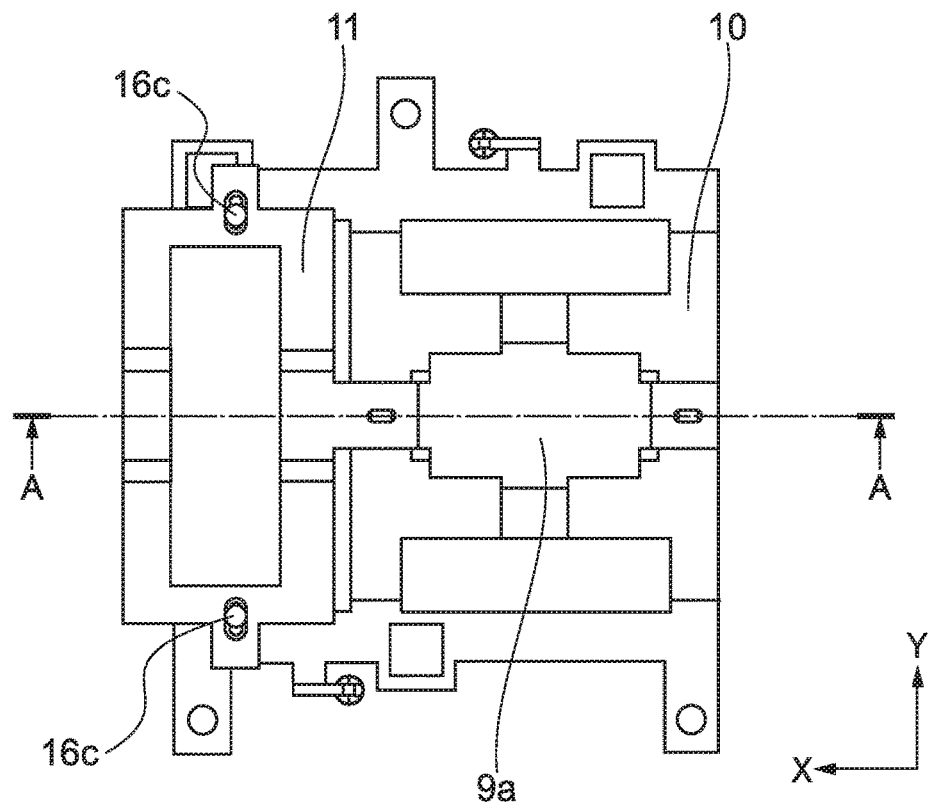
FIGS. 6A and 6B are a rear view and a cross-sectional view of part of the image blur correction device, respectively.
Figure 6B:
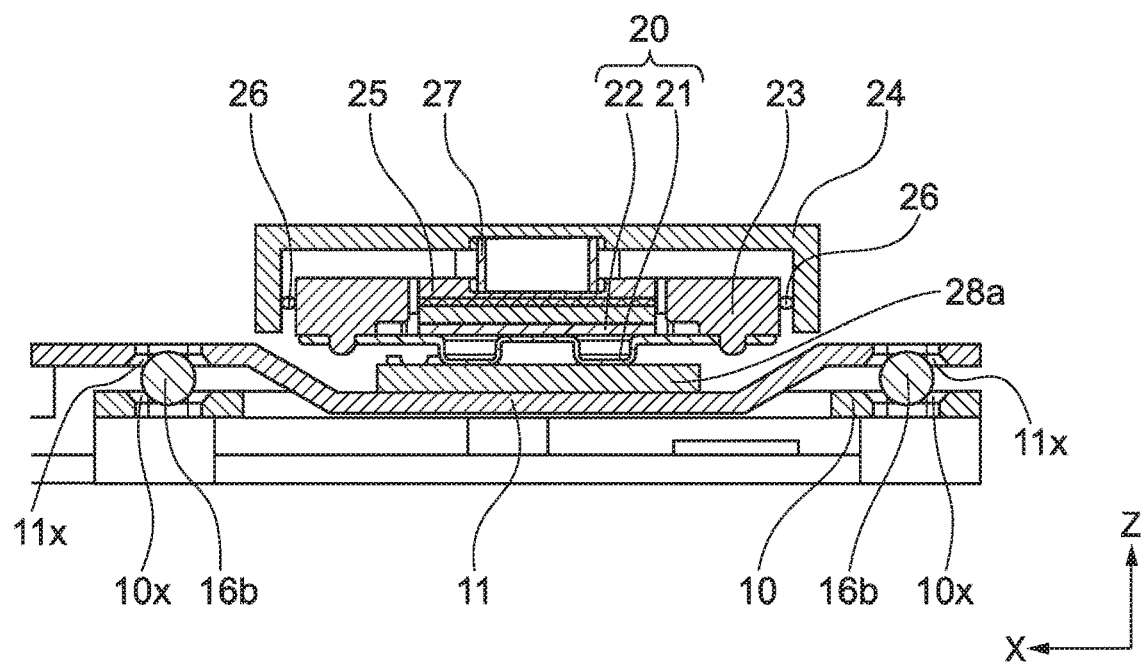

Here, the structure of the first vibration actuator 9a will be described. FIG. 6A is a partial rear view of the image blur correction device 7. FIG. 6B is a cross-sectional view, taken along A-A in FIG. 6A. The first vibration actuator 9a includes the vibration element 20, a vibration element-holding member 23, a spring supporting member 24, an elastic member 25, rollers 26, a pressure spring 27, and the contact body 28a. The vibration element 20 has a thin plate-shaped elastic body 21 and a piezoelectric element 22.

The piezoelectric element 22 is fixed to one of surfaces (X-Y plane) of the elastic body 21 e.g. with an adhesive. A surface of the elastic body 21, opposite from the surface to which the piezoelectric element 22 is fixed, is formed with two protruding portions at a predetermined space interval in the X-axis direction. The vibration element 20 can be excited by applying a predetermined AC voltage to the piezoelectric element 22 through wires, not shown. More specifically, the vibration element 20 is excited such that an elliptical or circular motion of a tip end of each protruding portion is caused within a Z-X plane. However, this excitation method and configuration are well-known, and hence detailed description thereof is omitted.

The vibration element 20 is fixed to the vibration element-holding member 23 e.g. with an adhesive at ends of the elastic body 21 in a longitudinal direction (X-axis direction). The spring supporting member 24 is fixed to the fixed member 10 e.g. with screws (not shown). The pressure spring 27 is disposed between the spring supporting member 24 and the vibration element-holding member 23 to press the vibration element-holding member 23 toward the contact body 28a. The spring supporting member 24 supports the vibration element-holding member 23 via the rollers 26 such that the vibration element-holding member 23 is movable in the Z-axis direction which is a pressure direction of the pressure spring 27 and is unmovable in the X-axis direction in which a friction drive force is applied to the contact body 28a. This makes it possible to hold the vibration element 20 in a stable posture and maintain the vibration element 20 in a stable friction sliding state with respect to the contact body 28a.

Note that the structure of supporting the vibration element-holding member 23 such that the vibration element-holding member 23 is movable in the Z-axis direction and unmovable in the X-axis direction with respect to the spring supporting member 24 is not limited to the structure via the rollers 26. For example, the spring supporting member 24 and the vibration element-holding member 23 may be connected to each other via a thin plate-shaped elastic member which has a higher rigidity in the X-axis direction than in the Z-axis direction.

The vibration element 20 is brought into contact, by the pressure force of the pressure spring 27, with the contact body 28a at the tip ends of the protruding portions formed on the elastic body 21. The elastic member 25 is disposed between the pressure spring 27 and the vibration element 20 and the pressure spring 27 presses the vibration element 20 against the contact body 28a via the elastic body 25. Although a flexible printed wiring board, not shown, which is used for supplying electric power to the piezoelectric element 22a is disposed on a surface of the piezoelectric element 22 toward the elastic body 25, the pressure spring 27 is prevented from being directly brought into contact with the piezoelectric element 22 and the flexible printed wiring board, by disposing the elastic body 25. This makes it possible to prevent the piezoelectric element 22 and the flexible printed wiring board from being damaged.

Note that the structure of pressing the vibration element-holding member 23 toward the contact body 28a is not limited to the structure using the pressure force of the pressure spring 27. For example, by using members urged by a plurality of springs, the urging forces of the plurality of springs may be transmitted to the elastic member 25 as the pressure force.

The contact body 28a is fixed to the first guide member 11 with e.g. screws (not shown) or an adhesive. When elliptical motions of the tip ends of the protruding portions formed on the vibration element 20 are caused by applying a driving voltage to the piezoelectric element 22, the tip ends of the protruding portions apply a friction drive force to the contact body 28a, whereby the contact body 28a and the first guide member 11 are driven in the X-axis direction in unison.

Note that the direction of rotation of the elliptical motion of the tip end of each protruding portion can be reversed by controlling the phase of the driving voltage, and this driving method is well-known, and hence detailed description thereof is omitted. Further, the structure and the driving method of the second vibration actuator 9b and the third vibration actuator 9c are the same as the structure and the driving method of the first vibration actuator 9a, and hence description thereof is omitted.

As described above, the image blur correction device 7 has the structure in which lots of parts of the holding member 14, the three vibration actuators, and the three guide members are arranged rearward of the image capture device 6, and an amount of protrusion of the image blur correction device 7 from the image capture device 6 as viewed from the direction of the optical axis O is small. More specifically, the first vibration actuator 9a and the second vibration actuator 9b are arranged at respective locations overlapping the image capture device 6, as viewed from the direction of the optical axis O. Thus, it is possible to reduce the size of the image blur correction device 7 in the X-Y plane (in the X-axis direction and the Y-axis direction). Further, the three vibration actuators each have a thin plate-like shape, and hence it is possible to reduce the whole thickness of the image blur correction device 7 in the direction of the optical axis O. As a result, it is possible to reduce the size of the camera body 2.

Further, the holding member 14 is connected to the second guide member 12 via the third guide member 13, and is connected to the first guide member 11 via the second guide member 12. Therefore, by urging the holding member 14 against the fixed member 10 using the urging springs 15, it is possible to position the holding member 14 in the Z-axis direction with respect to the fixed member 10, only with the dimensional tolerance of the three balls 16a.

Conventionally, the image blur correction device that moves the optical element by using the vibration actuator has a problem of how to suppress generation of wear powder during driving. Next, a structure of suppressing generation of wear powder in the image blur correction device 7 will be described.

Figure 7A:
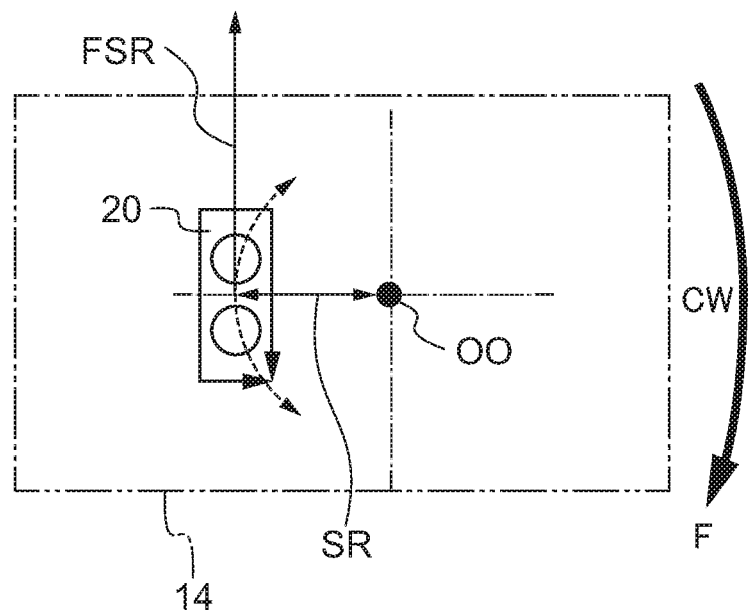
FIGS. 7A and 7B are views useful in explaining the magnitude of thrust required to rotate a holding member.
Figure 7B:
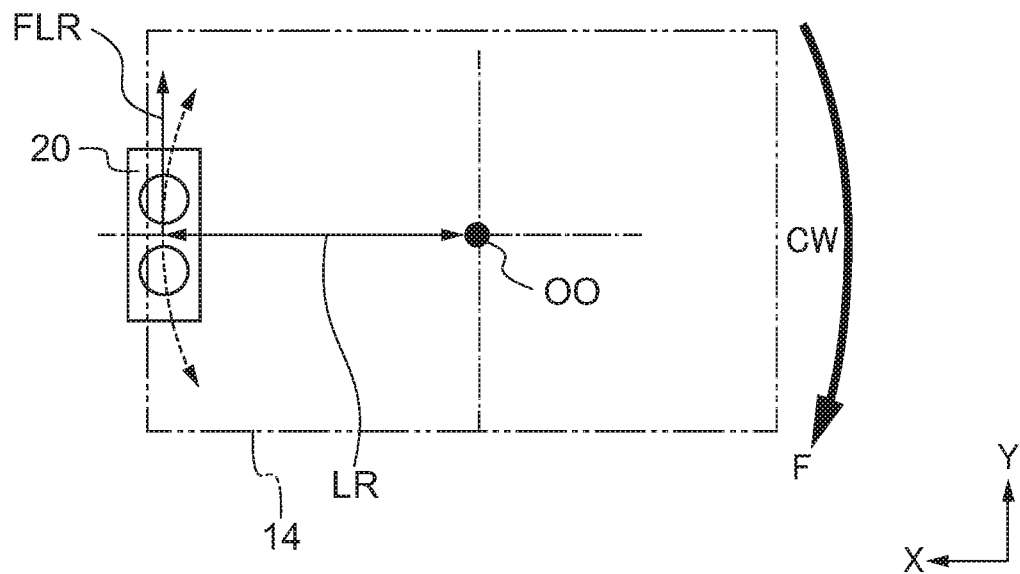

FIGS. 7A and 7B are views useful in explaining the magnitude of thrust required to rotate the holding member 14, in which a positional relationship between the holding member 14 and the vibration element 20, as viewed from the axial direction of the optical axis O, is illustrated. FIG. 7A and FIG. 7B differ from each other in the position of the vibration element 20 of the vibration actuator with respect to the center of rotation of the holding member 14, i.e. the position where thrust is applied to the holding member 14. A radius of rotation of the holding member 14 in FIG. 7A is represented by "SR", a radius of rotation of the same FIG. 7B is represented by "LR", with the rotation radius SR being shorter than the rotation radius LR (SR<LR).

The arrangement in FIG. 7A will be described. As described above, the holding member 14 is rotatable about the optical axis O. A point where the optical axis O and the image forming surface of the image capture device 6 intersect is defined as the rotation center OO. In a case where the holding member 14 is rotated in a clockwise direction (CW direction), the vibration element 20 generates thrust in a direction indicated by an arrow FSR. In the arrangement in FIG. 7A, the vibration element 20 is arranged at a location remote from the rotation center OO by the rotation radius SR. The magnitude of the thrust required to rotate the holding member 14 in this case is schematically expressed by the length of the arrow FSR in FIG. 7A.

Next, the arrangement in FIG. 7B will be described. Similar to the case shown in FIG. 7A, a point where the optical axis O and the X-Y plane of the image capture device 6 intersect is defined as the rotation center OO. In a case where the holding member 14 is rotated in a clockwise direction, the vibration element 20 generates thrust in a direction indicated by an arrow FLR. In the arrangement in FIG. 7B, the vibration element 20 is arranged at a location remote from the rotation center OO by the rotation radius LR. The magnitude of the thrust required to rotate the holding member 14 in this case is schematically expressed by the length of the arrow FLR in FIG. 7B.

The arrangement in FIG. 7A and the arrangement in FIG. 7B are compared. In a case where thrust F for rotating the holding member 14 is generated, in the arrangement in FIG. 7A, based on the relationship of moment of force, there holds a relationship expressed by "F=FSR×SR" using the thrust FSR and the rotation radius SR. Similarly, in the arrangement in FIG. 7B, there holds a relationship expressed by "F=FLR×LR" using the thrust FLR and the rotation radius LR. Here, since "SR<LR" is defined, a relationship expressed by "FSR>FLR" is obtained, from the relationships of "FSR×SR=FLR×LR" and "LR>SR". That is, as the rotation radius is shorter, the thrust required to drive the holding member 14 becomes larger.

In general, in the vibration actuator configured to excite an elliptical motion of the tip end of the protruding portion formed on the vibration element and thereby apply thrust from the protruding portion to the contact body, as the thrust required to drive the contact body becomes larger, a reaction force acting from the contact body on the protruding portion also becomes larger. When the thrust and the reaction force, acting between the protruding portion and the contact body, thus become larger, wear of the contact body is likely to progress, which generates wear powder. Therefore, to suppress generation of wear powder, it is desirable that the vibration actuator can drive the contact body with small thrust. The image blur correction device 7 has the third vibration actuator 9c arranged at a location as remote as possible from the rotation center OO to rotate the holding member 14. This makes it possible to suppress wear of the contact body 28c and thereby suppress generation of wear powder.

Figure 8:
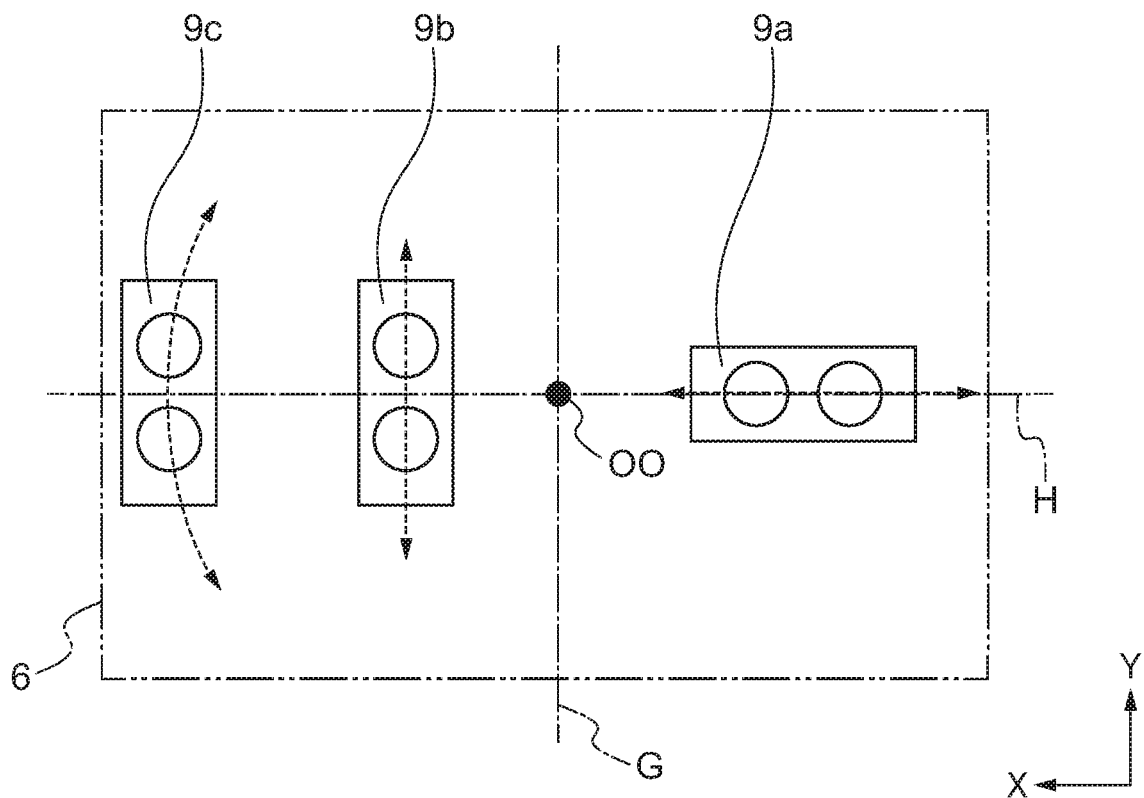
FIG. 8 is a schematic view showing the arrangement of three vibration actuators.

Next, the arrangement of the three vibration actuators in the image blur correction device 7 will be described. FIG. 8 is a schematic view showing the arrangement of the three vibration actuators in the image blur correction device 7 with respect to the image capture device 6, as viewed from the axial direction of the optical axis O. As shown in FIG. 8, the third vibration actuator 9c is arranged at a location more remote from the rotation center OO than the first vibration actuator 9a and the second vibration actuator 9b. The first vibration actuator 9a is arranged on an axis H passing the rotation center OO and parallel to the X-axis direction, in an area opposite in the X-axis direction from an area where the third vibration actuator 9c is arranged, across an axis G passing the rotation center OO and parallel to the Y-axis direction. Therefore, a generating position of thrust to be applied by the first vibration actuator 9a to drive the first guide member 11 in the X-axis direction is set on the axis H. With this, when the first guide member 11 is driven in the X-axis direction, it is possible to level or reduce a shake of the first guide member 11 due to inclination thereof and a bound of the same caused when it is stopped, as viewed relative to the whole image forming surface of the image capture device 6. Note that it is necessary to ensure a space where other components are arranged on the right side of the rotation center OO, in FIG. 8, depending on the construction. In this case, the first vibration actuator 9a may be arranged e.g. at any of a location overlapping the rotation center OO, a location between the rotation center OO and the second vibration actuator 9b, and a location on the left side of the third vibration actuator 9c.

The second vibration actuator 9b is arranged on the axis H and also in the vicinity of the optical axis O (rotation center OO) of the lens barrel 1 between the first vibration actuator 9a and the third vibration actuator 9c in the X-axis direction. This makes it possible to set a generating position of thrust to be applied by the second vibration actuator 9b to the second guide member 12 in the Y-axis direction, in the vicinity of the optical axis O of the lens barrel 1. As a result, when the second guide member 12 is driven in the Y-axis direction, it is possible to level or reduce a shake of the second guide member 12 due to inclination thereof and a bound of the same caused when it is stopped, as viewed relative to the whole image forming surface of the image capture device 6.

Figure 9A:
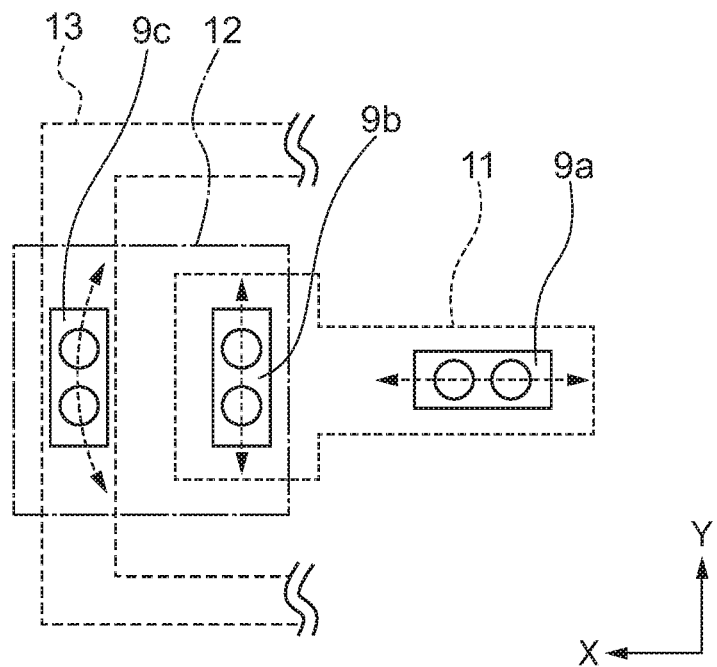
FIGS. 9A and 9B are schematic views each showing a positional relationship between guide members and the vibration actuators, in the present invention and a comparative example, respectively.

Next, characteristic features of the arrangement of the three guide members in the image blur correction device 7 will be described. FIG. 9A is a schematic view showing a positional relationship between the three guide members and the three vibration actuators in the image blur correction device 7 according to the present invention. In the image blur correction device 7, the first vibration actuator 9a mounted on the fixed member 10 drives the first guide member 11, to thereby move the second guide member 12, the third guide member 13, the second vibration actuator 9b, and the third vibration actuator 9c at the same time. The second vibration actuator 9b mounted on the first guide member 11 drives the second guide member 12 to thereby move the third guide member 13 and the third vibration actuator 9c at the same time. The third vibration actuator 9c mounted on the second guide member 12 drives the third guide member 13.

From the above, a vibration actuator having the highest driving load, out of the three vibration actuators, is the first vibration actuator 9a mounted on the fixed member 10. Here, in the image blur correction device 7, the first guide member 11 is restricted from being driven in the Y-axis direction, by the pairs of rolling grooves 10x and 11x (see FIG. 5), each having a substantially oval shape, and the balls 16b sandwiched and held between the rolling grooves 10x and 11x. That is, when the image capture apparatus 8 is in the normal position, the first guide member 11 is supported by the fixed member 10 via the balls 16b sandwiched and held between the rolling grooves 10x and 11x even if the first vibration actuator 9a does not frictionally hold the first guide member 11. In other words, the image blur correction device 7 has a structure in which when the image capture apparatus 8 is in the normal position to which it is generally most frequently set of all possible positions thereof, the first vibration actuator 9a is not required to support the first guide member 11 and the components connected to the first guide member 11 in the vertical direction. As a result, it is possible to reduce the driving load of the first vibration actuator 9a. Further, since the driving load is reduced, it is possible to reduce the thrust to be generated by the first vibration actuator 9a, which makes it possible to suppress generation of wear powder.

Figure 9B:
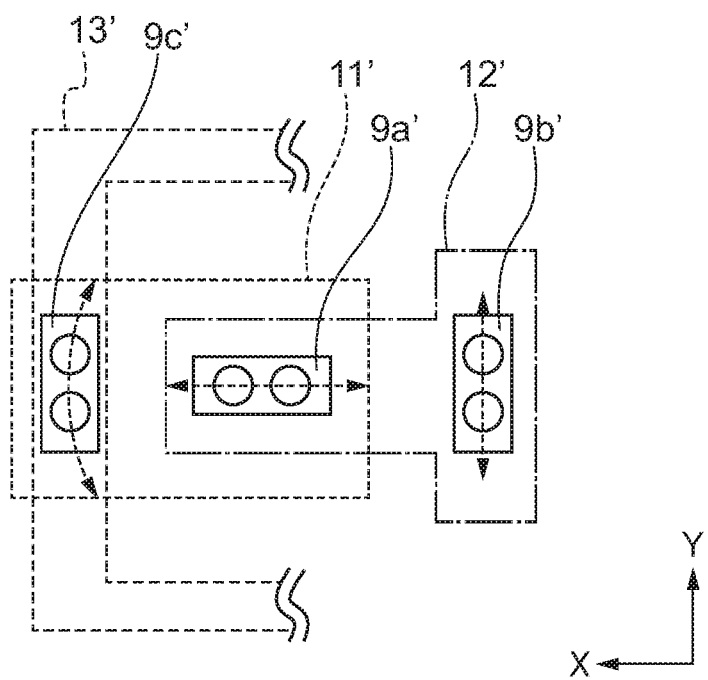

FIG. 9B is a schematic view showing a positional relationship between three guide members and three vibration actuators in a comparative example of the image blur correction device. The image blur correction device according to the comparative example includes a guide member 11' that moves the holding member 14 in the X-axis direction, a guide member 12' that moves the same in the Y-axis direction, and a guide member 13' that moves the same in the rotational direction.

Although not shown in detail in the comparative example, balls are sandwiched and held between oval rolling grooves, extending in the Y-axis direction, formed in the fixed member 10 (not shown in FIG. 9B), and oval rolling grooves, extending in the Y-axis direction, formed in the guide member 12'. With this, the guide member 12' is movable in the Y-axis direction with respect to the fixed member 10, but is restricted from moving in the X-axis direction. Further, a vibration actuator 9b' is mounted on the fixed member 10, a vibration actuator 9a' is mounted on the guide member 12', and a vibration actuator 9c' is mounted on the guide member 11'. The vibration actuator 9a' drives the guide member 11' in the X-axis direction, and the vibration actuator 9c' drives the guide member 13' for rotation.

In a case where the image capture apparatus 8 is in the normal position, in the comparative example, the fixed member 10 cannot support the guide member 12' via the balls arranged between the fixed member 10 and the guide member 12', in the Y-axis direction which is the vertical direction. Therefore, it is necessary to generate thrust for driving the guide member 12' in the Y-axis direction in addition to a friction holding force for holding the guide member 12' in the Y-axis direction. Although illustration and detailed description are omitted, even in a case where the image blur correction device is configured such that the balls are sandwiched and held between the guide member 13' and the fixed member 10, the same result is obtained as obtained from the comparative example shown in FIG. 9B.

As described above, in the arrangement shown in FIG. 9B, when the image capture apparatus 8 is in the normal position, the driving load of the vibration actuator 9b' is not reduced by the balls arranged between the fixed member 10 and the guide member 12'. On the other hand, in the image blur correction device 7 shown in FIG. 9A, when compared with the comparative example, the driving load of the first vibration actuator 9a mounted on the fixed member 10 can be reduced by the balls arranged between the fixed member 10 and the first guide member 11.

Figure 10:
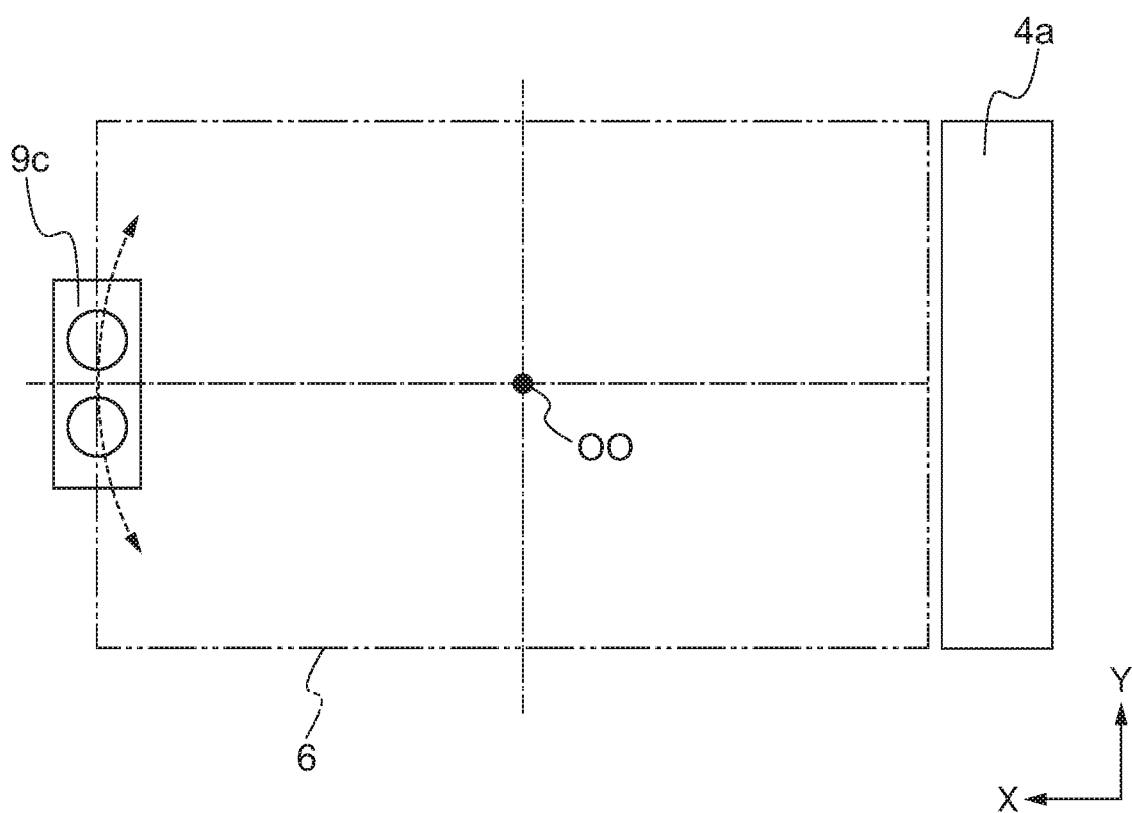
FIG. 10 is a rear view of the inside of a camera body.

Next, a relationship between the various drive units arranged adjacent to the image capture device 6 and the image blur correction device 7 will be described. FIG. 10 is a rear view of the inside of the camera body 2. Although FIG. 10 schematically shows the image capture device 6, the third vibration actuator 9c, and a drive section 4a of the shutter unit 4, there is a case, for example, where a battery or the like is disposed around the image capture device 6.

As described above, it is desirable that the third vibration actuator 9c that rotates the holding member 14 is arranged at a location as remote as possible from the rotation center OO (optical axis O) so as to suppress generation of wear powder during driving. To realize this arrangement, the third vibration actuator 9c is often arranged such that it protrudes from an outer shape of the image capture device 6, as viewed from the Z-axis direction. In this case, by disposing the drive section 4a of the shutter unit 4 on an opposite side from the third vibration actuator 9c across the image capture device 6, it is possible to realize both of size reduction of the camera body 2 and suppression of generation of wear powder.

The present invention has been described heretofore based on the embodiments thereof. However, the present invention is not limited to these embodiments, but it is to be understood that the invention includes various forms within the scope of the gist of the present invention. Further, it is possible to combine part of the embodiments on an as-needed basis. For example, although the construction has been described in which the vibration actuators having substantially the same structure are used as drive sources used for the image blur correction device, vibration actuators having different structures may be used. Further, a voice coil motor (VCM) or the like may be used in place of the vibration actuator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036139, filed Feb. 28, 2019, which is hereby incorporated by reference herein in its entirety.

What is claimed is:

1. An image blur correction device comprising:
   a driven member;
   a fixed member configured to movably hold the driven member in a first direction which is parallel to a first-axis direction, in a second direction which is parallel to a second-axis direction orthogonal to the first-axis direction, and in a rotational direction about an axis extending in a third direction which is orthogonal to the first-axis direction and the second-axis direction;
   a first movable member configured to linearly guide the driven member in the first direction;
   a second movable member configured to linearly guide the driven member in the second direction;
   a third movable member configured to guide the driven member in the rotational direction;
   a first actuator configured to drive the first movable member;
   a second actuator configured to drive the second movable member; and
   a third actuator configured to drive the third movable member,
   wherein the driven member is a holding unit for holding an image capture device, and
   wherein the third movable member is arranged at a location more remote from a rotation center of the third movable member than at least one of the first actuator and the second actuator, as viewed from the third direction.

2. The image blur correction device according to claim 1, wherein the third movable member is rotatable about a central axis passing a center of the image capture device.

3. The image blur correction device according to claim 1, wherein one of the first actuator and the second actuator is arranged between the third movable member and the rotation center, as viewed from the third direction.

4. The image blur correction device according to claim 3, wherein the third movable member and the other of the first actuator and the second actuator are arranged on opposite sides across the rotation center, as viewed from the third direction.

5. The image blur correction device according to claim 1, wherein the third actuator is a vibration actuator including a vibration element and a contact body that is in contact with the vibration element, and
   wherein the vibration element is mounted on the second movable member, and the contact body is mounted on the third movable member.

6. The image blur correction device according to claim 1, wherein in a state in which the third direction is parallel to a horizontal direction, the fixed member and the first movable member have a pair of rolling grooves of which a longitudinal direction is the horizontal direction, and
   wherein a rolling member is sandwiched and held between the pair of rolling grooves.

7. The image blur correction device according to claim 6, wherein in a state in which the driven member has an image capture device rectangular in shape, the longitudinal direction of the pair of rolling grooves is parallel to a long side of the image capture device.

8. The image blur correction device according to claim 1, wherein the first actuator is mounted on the fixed member,
   wherein the second actuator is mounted on the first movable member,
   wherein the third actuator is mounted on the second movable member, and
   wherein the third movable member is connected to the driven member.

9. An image capture apparatus, comprising:
   an image capture device, and
   an image blur correction device,
   the image blur correction device including:

a driven member;

a fixed member configured to movably hold the driven member in a first direction, in a second direction orthogonal to the first direction, and in a rotational direction about an axis extending in a third direction orthogonal to the first direction and the second direction;

a first movable member configured to guide the driven member in the first direction;

a second movable member configured to guide the driven member in the second direction;

a third movable member configured to guide the driven member in the rotational direction;

a first actuator configured to drive the first movable member;

a second actuator configured to drive the second movable member; and a third actuator configured to drive the third movable member, wherein the driven member is a holding unit for holding an image capture device or is an image capture device, and wherein the third movable member is arranged at a location more remote from a rotation center of the third movable member than at least one of the first actuator and the second actuator, as viewed from the third direction.

10. The image capture apparatus according to claim 9, further comprising a drive unit configured to drive a shutter for controlling an amount of exposure to the image capture device, and wherein the third movable member of the image blur correction device and the drive unit are arranged on respective opposite sides across the rotation center, as viewed from the third direction.

11. The image capture apparatus according to claim 9, wherein the first actuator, the second actuator, the third actuator, the first movable member, the second movable member, and the third movable member are arranged rearward of the image capture device.

12. The image capture apparatus according to claim 11, wherein the first actuator and the second actuator are arranged at locations overlapping the image capture device, as viewed from the third direction.

* * * * *